United States Patent [19]

Urabe et al.

[11] Patent Number: 5,717,399
[45] Date of Patent: Feb. 10, 1998

[54] RADAR DEVICE FOR VEHICLE USE

[75] Inventors: Masanobu Urabe; Masahito Shingyoji, both of Wako, Japan

[73] Assignee: Honda Giken Kogyo Kabushiki Kaisha, Tokyo, Japan

[21] Appl. No.: 559,709

[22] Filed: Nov. 15, 1995

[30] Foreign Application Priority Data

Nov. 17, 1994 [JP] Japan ............................. 6-308159

[51] Int. Cl.$^6$ ............................................. G01S 13/93
[52] U.S. Cl. ............................. 342/70; 342/85; 342/87; 342/99
[58] Field of Search ........................... 342/70, 71, 72, 342/85, 87, 99

[56] References Cited

U.S. PATENT DOCUMENTS 5,181,037  1/1993  Komatsu .............................. 342/70
5,229,774  7/1993  Komatsu ............................. 342/133

FOREIGN PATENT DOCUMENTS 4259874  3/1992  Japan .

Primary Examiner—John B. Sotomayor
Attorney, Agent, or Firm—Lyon & Lyon LLP

[57] ABSTRACT

A radar device for vehicle use which can be manufactured inexpensively while enhancing its monitoring function for an adjacent object as well as a remote object. The radar device includes a radar module for monitoring an adjacent object having a plurality of adjacent object monitoring antennas, a signal transmitting/receiving section for supplying transmitting signals to the adjacent object monitoring antennas and outputting signals by mixing the transmitting signals with received signals supplied from the adjacent monitoring antennas and a delay circuit inserted between the signal transmitting/receiving section and the adjacent object monitoring antennas. The radar device also includes a module for monitoring a remote object having a remote object monitoring antenna and a signal transmitting/receiving section for supplying transmitting signals to the remote object monitoring antenna and generating signals by mixing the transmitting signals with received signals supplied from the remote monitoring antenna. The radar device has a monitoring control section for controlling the operations of both the radar module for monitoring an adjacent object and the radar module for monitoring a remote object and the monitoring control section receives the signals output from the radar modules and detects the range to the object which generates reflected signals based on the beat signals.

27 Claims, 10 Drawing Sheets

FIG.6A

| remote 1 | remote 2 | remote 3 | remote 4 | adjacent 1 | adjacent 2 | adjacent 3 | adjacent 4 | remote 1 |
|---|---|---|---|---|---|---|---|---|

FIG.6B

| remote 1 | remote 2 | remote 3 | remote 4 | adjacent 1-1 | adjacent 1-2 | adjacent 1-3 | adjacent 2 | adjacent 3 | adjacent 4 | remote 1-1 |
|---|---|---|---|---|---|---|---|---|---|---|

FIG.6C

| adjacent 1-1 | adjacent 1-2 | adjacent 1-3 | adjacent 2-1 | adjacent 2-2 | adjacent 2-3 | adjacent 3-1 | adjacent 3-2 | adjacent 3-3 | adjacent 4 | adjacent 1-1 |
|---|---|---|---|---|---|---|---|---|---|---|

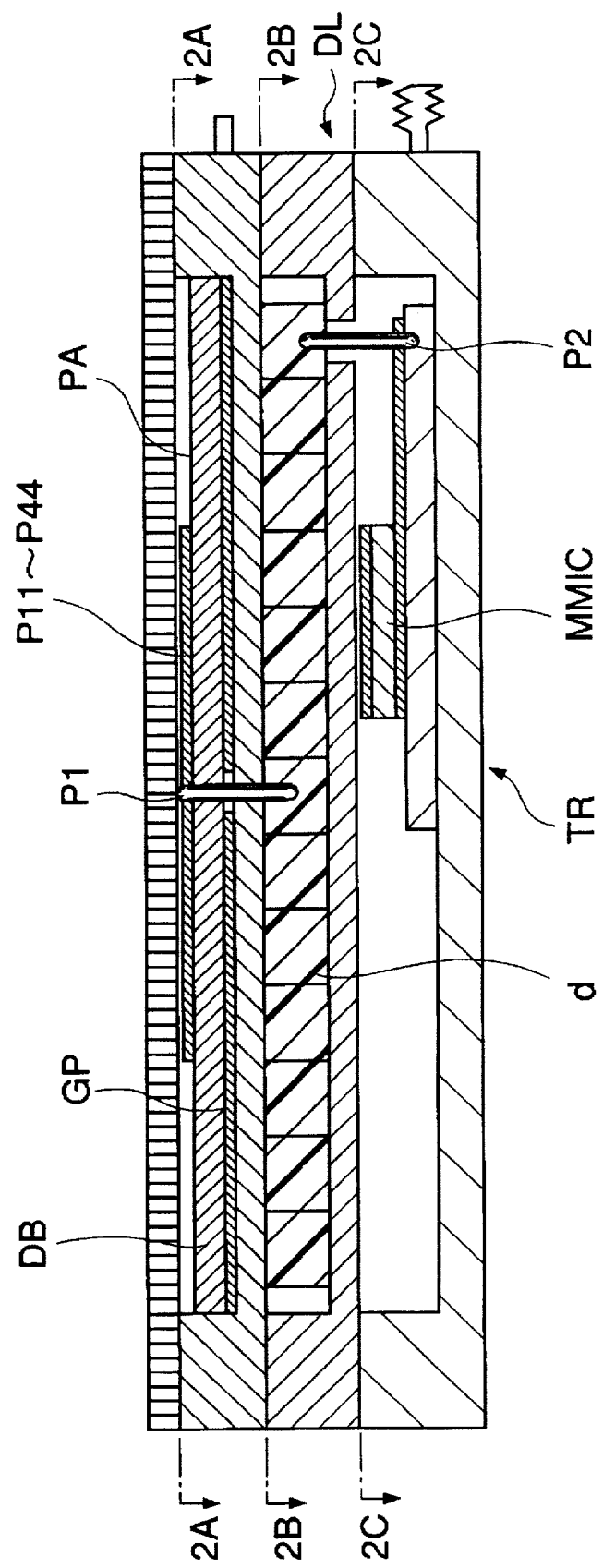

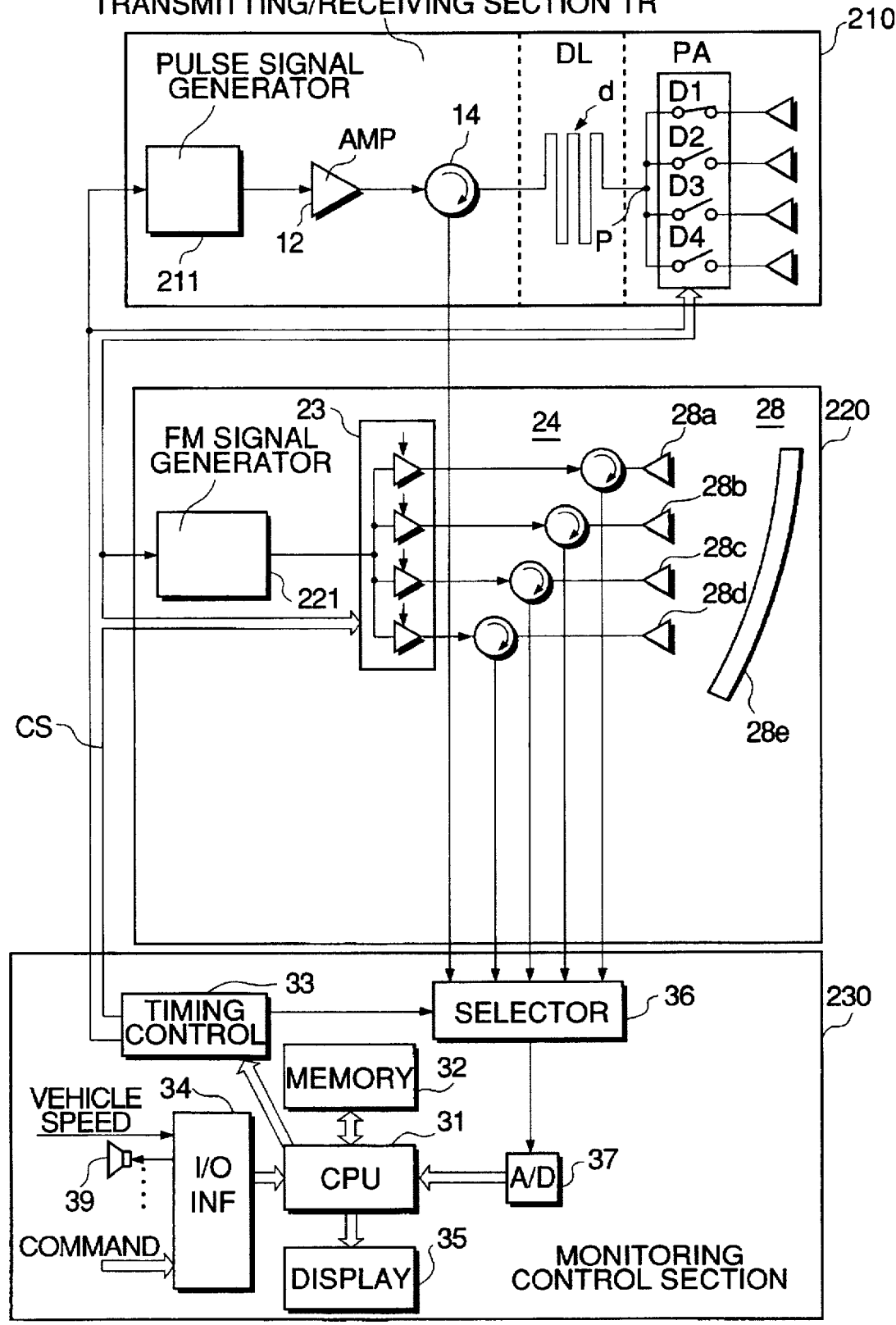

RADAR DEVICE FOR VEHICLE USE

BACKGROUND OF THE INVENTION

1. Field of the Invention

This invention relates to a radar device for vehicle use and, more particularly, a radar device for vehicle use which enables various operations including collision prevention or automatic navigation at high speed traveling, cruising in a traffic jam at intermediate or low speed traveling and the detection of an obstacle around a vehicle.

2. Prior Art

The radar devices for vehicle use have been used in conjunction with warning devices and display devices for the prevention of a collision. The development of such radar devices has been focused on the laser type and the radio wave type. The laser type radar devices, however, have a drawback that the propagation range is decreased under an extremely adverse condition peculiar to vehicles such as under rain, snow or frost resulting in a drastic lowering of the detecting ability, while the radio wave type radar devices have the advantage that the devices suffer very little lowering of detecting ability under rain or snow although the devices have problems in terms of prevention of interference and improvement in direction sensitivity resolution.

The radio wave type radar devices for vehicle use sense a collision accident will occur in a jammed traffic condition where the interval between vehicles is small and a contact accident will occur when the vehicle enters a garage. Accordingly, the radar devices must have a sufficient adjacent object detecting ability of some dozen centimeters. From this point of view, FM radar devices and AM devices are preferred to the pulse radar devices. Furthermore, since the longest monitoring range is approximately 150 m at best, for a compact radar module, especially the antenna thereof, the use of radio waves which fall in the millimeter wave band of the high frequency wave is desirable. The FM radar systems which use such millimeter wave band are disclosed in Japanese laid-open patent publication (Kokai) 3-42979 filed by the inventors of this invention.

In general, FM radar devices generate beat signals which increase the frequency thereof according to the increase of range to an object which generates reflected waves. Accordingly, as the range to the object becomes shorter, the frequency of the beat signals is decreased. Thus, the detection of such frequency of the beat signals becomes impossible due to the disturbance of 1/f noise generated in the mixer. The radar systems disclosed in the above-mentioned patent application adopt the heterodyne system which converts the frequency of local signals or insert a delay circuit between the transmitting/receiving section and the antenna, in order to increase the frequency of the beat signals for deceasing the disturbance of 1/f noise.

The conventional radar devices which adopt the heterodyne system, however, necessitate a local oscillator having an extremely high frequency stability for the conversion of the local signals so that the radar devices become costly. On the other hand, the conventional radar devices which insert the delay circuit between the transmitting/receiving section and the antenna suffer from the lowering of power which is caused by the insertion of the delay circuit whereby the maximum range in which the radar devices can detect the object becomes shorter. Furthermore, with respect to the antenna, an antenna which monitors a remote object located at a range of 150 m and an antenna which monitors an adjacent object located at a range of tens of centimeters have completely different characteristics, including direction sensitivity (directivity), so that it is impossible to cover the entire range which varies by three decimal places with one type of antenna.

SUMMARY OF THE INVENTION

It is an object of the present invention to provide a radar device for vehicle use which can enhance the monitoring function of an adjacent object as well as a remote object while minimizing the manufacturing cost of the radar device.

It is another object of the present invention to provide a radar device for vehicle use which can enhance the total monitoring function of the radar device in any traveling condition such as high speed traveling, traveling on a jammed road or on a narrow street or at the time the vehicle is entering a garage.

To attain the above objects, according to a first aspect of the invention, there is provided a radar device for vehicle use comprising; an FM radar module for monitoring an adjacent object including a plurality of adjacent object monitoring antennas, a signal transmitting/receiving section for supplying transmitting FM signals to the adjacent object monitoring antennas and generating beat signals by mixing the transmitting FM signals with received FM signals supplied from the adjacent monitoring antennas and a delay circuit inserted between the signal transmitting/receiving section and the adjacent object monitoring antennas, an FM radar module for monitoring a remote object including a remote object monitoring antenna and a signal transmitting/receiving section for supplying transmitting FM signals to the remote object monitoring antenna and generating beat signals by mixing the transmitting FM signals with received FM signals supplied from the remote monitoring antenna, and a monitoring control section controlling operations of the FM radar module for monitoring an adjacent object and the FM radar module for monitoring a remote object, the monitoring control section receiving said beat signals output from the FM radar modules and detecting a range to the object which generates reflected signals based on frequencies of the beat signals.

Preferably, the monitoring control section alters the ratio of the operation time of the FM radar module for monitoring the remote object relative to the operation time of the FM radar module for monitoring the adjacent object according to the velocity of the vehicle on which the radar device is mounted.

Preferably, the monitoring control section sets the ratio of the operation time of the FM radar module for monitoring the remote object relative to the operation time of the FM radar module for monitoring the adjacent object at zero when the vehicle is traveling below a predetermine speed.

Preferably, the adjacent object monitoring antennas of the FM radar module for monitoring an adjacent object include a plurality of plane antennas capable of transmitting and receiving signals which have different beam tilting angles respectively, have relatively narrow directivities, and are selectively connected with the signal transmitting/receiving section under control of the monitoring control section.

Preferably, the adjacent object monitoring antennas of the FM radar module for monitoring an adjacent object further include wide angle plane antennas which have a relatively wide directivity and are selectively connected with the signal transmitting/receiving section under the control of the monitoring control section.

Preferably, during a period in which the monitoring control section receives the FM signal above a predetermined value through at least any one of the adjacent object monitoring antennas, the monitoring control section shifts to a high resolution mode where the monitoring control section sequentially operates a plurality of the plane antennas which have a relatively narrow directivity, while during other periods, the monitoring control section shifts to a low resolution mode where the monitoring control section operates only the plane antenna having a relatively wide directivity.

Preferably, the remote object monitoring antenna of the FM radar module for monitoring a remote object is a defocused offset antenna which includes a reflection mirror and a plurality of primary radiators which are arranged at or in the neighborhood of a focus of the reflection mirror and are sequentially connected with the signal transmitting/receiving section.

According to a second aspect of the invention, there is provided a radar device for vehicle use comprising; an AM radar module for monitoring an adjacent object including a plurality of adjacent object monitoring antennas, a signal transmitting/receiving section for supplying transmitting AM signals to the adjacent object monitoring antennas and outputting detected signals obtained by detecting received AM signals supplied from the antennas and a delay circuit inserted between the signal transmitting/receiving section and the adjacent object monitoring antennas, an AM radar module for monitoring a remote object including a remote object monitoring antenna and a signal transmitting/receiving section for supplying transmitting AM signals to the remote object monitoring antenna and outputting detected signals obtained by detecting received AM signals supplied from the remote monitoring antenna, and a monitoring control section controlling operations of the AM radar module for monitoring an adjacent object and the AM radar module for monitoring a remote object, the monitoring control section receiving modulated signals output from the radar modules and detecting a range to an object based on a phase difference between the received detected signals and modulated signals employed for generating the AM signals.

Preferably, the monitoring control section alters the ratio of the operation time of the AM radar module for monitoring a remote object relative to the operation time of the AM radar module for monitoring an adjacent object according to the velocity of the vehicle on which the radar device is mounted.

According to a third aspect of the invention, there is provided a radar device for vehicle use comprising; a pulse radar module for monitoring an adjacent object including a plurality of adjacent object monitoring antennas, a signal transmitting/receiving section for supplying transmitting pulse signals to the adjacent object monitoring antennas and outputting received pulse signals supplied from the adjacent monitoring antennas and a delay circuit inserted between the signal transmitting/receiving section and the adjacent object monitoring antennas, a pulse radar module for monitoring a remote object including a remote object monitoring antenna and a signal transmitting/receiving section for feeding transmitting pulse signals to the remote object monitoring antenna and outputting received pulse signals from the remote monitoring antenna, and a monitoring control section controlling operations of the pulse radar module for monitoring an adjacent object and the pulse radar module for monitoring a remote object, the monitoring control section being capable of detecting a range to the object based on a generating timing of received pulse signals output from the pulse radar modules.

Preferably, the monitoring control section alters the ratio of the operation time of the pulse radar module for monitoring the remote object relative to the operation time of the pulse radar module for monitoring the adjacent object according to the velocity of the vehicle on which the radar device is mounted.

In the above first to third aspects of the present invention, the radar module for monitoring an adjacent object which is provided with the inserted delay circuit can make the reflecting object appear to be located remote from the vehicle thus improving an adjacent object monitoring function. Although the insertion of the delay circuit gives rise to an insertion loss and the lowering of the electric power for transmitting and receiving radio waves and the range which can be monitored is decreased, this insertion of the delay circuit substantially causes no problem so long as the radar module for monitoring an adjacent object is used for monitoring of the adjacent object. Although the adjacent object monitoring function of the radar module for monitoring a remote object is injured since no delay circuit is inserted therein, this also substantially causes no problem so long as the radar module for monitoring a remote object is used for monitoring of the remote object. The removal of the delay circuit provides an increase of electric power of radiated radio waves at an amount which corresponds to the insertion so that the remote object monitoring function is enhanced.

In this manner, in the radar device for vehicle use of the present invention, while two separate radar modules are provided for adjacent object monitoring and remote object monitoring respectively, a common monitoring control section is provided for controlling the operations of these radar systems and for processing the outputs from these radar modules so as to detect the range to the object to be monitored. Accordingly, the monitoring function of the radar device is improved compared to the conventional radar device which carries out the adjacent object monitoring and the remote object monitoring with the common radar module. Furthermore, compared to a case in which two separate radar devices are manufactured and mounted on vehicles for monitoring of adjacent and remote objects, the radar device of the present invention can be manufactured readily and cheaply by using the common monitoring control section.

According to the preferred embodiment of the present invention, the ratio of the operation time of the adjacent object monitoring relative to the operation time of the remote object monitoring time is altered according to the speed of the vehicle. Namely, by taking into account the traveling condition that the remote object monitoring is important during high speed traveling while it is unnecessary during low speed traveling on a jammed road or on a narrow street or at the time the vehicle is entering a garage, the radar device shares a sufficient operation time to either module which carries a more important function at a particular time so that the total function of the radar device is enhanced.

According to a fourth aspect of the invention, there is provided a radar system which transmits high frequency signals to an object and receives reflected signals from the object and detects a range to the object based on the transmitted signals and the received signals comprising a first antenna having a wide directivity, a second antenna having a narrow directivity and means for switching operations of the first antenna and the second antenna on a time sharing basis.

Preferably, the second antenna having a narrow directivity comprises a plurality of antennas having different beam tilting angles respectively.

Preferably, the plurality of antennas having different beam tilting angles respectively are selectively switched on a time sharing basis.

Preferably, the first and second antennas are both plane antenna which are mounted on the same dielectric board.

Preferably, the operations are switched from the first antenna to the second antenna when the reflected signal from the object exceeds a threshold level Lth.

The above objects, features, and advantages of the invention will be more apparent from the following detailed description taken in conjunction with the accompanying drawings.

BRIEF DESCRIPTION OF THE INVENTION

FIGS. 6A, 6B and 6C are timing charts explaining three examples of the switching principle of antennas executed by the CPU of the monitoring control section shown in FIG. 1 between adjacent monitoring/remote monitoring FM radar modules as well as in respective FM radar modules.

FIG. 7 is a cross sectional view showing the construction of the FM radar module 10 for monitoring an adjacent object of the embodiment of FIG. 1.

FIGS. 8A, 8b and 8C are plan views taken on the lines 2A—2A, 2B—2B and 2C of FIG. 7 and showing the construction of respective layers of the FM radar module 10 for monitoring an adjacent object, wherein FIG. 8A shows an array of plane array antennas, PA, FIG. 8B shows a delayed portion DL and FIG. 8C shows a transmitting/receiving section TR.

FIG. 11 is a block diagram showing the construction of the pulse radar device for vehicle use according to another embodiment of the present invention.

DETAILED DESCRIPTION

Figure 1:
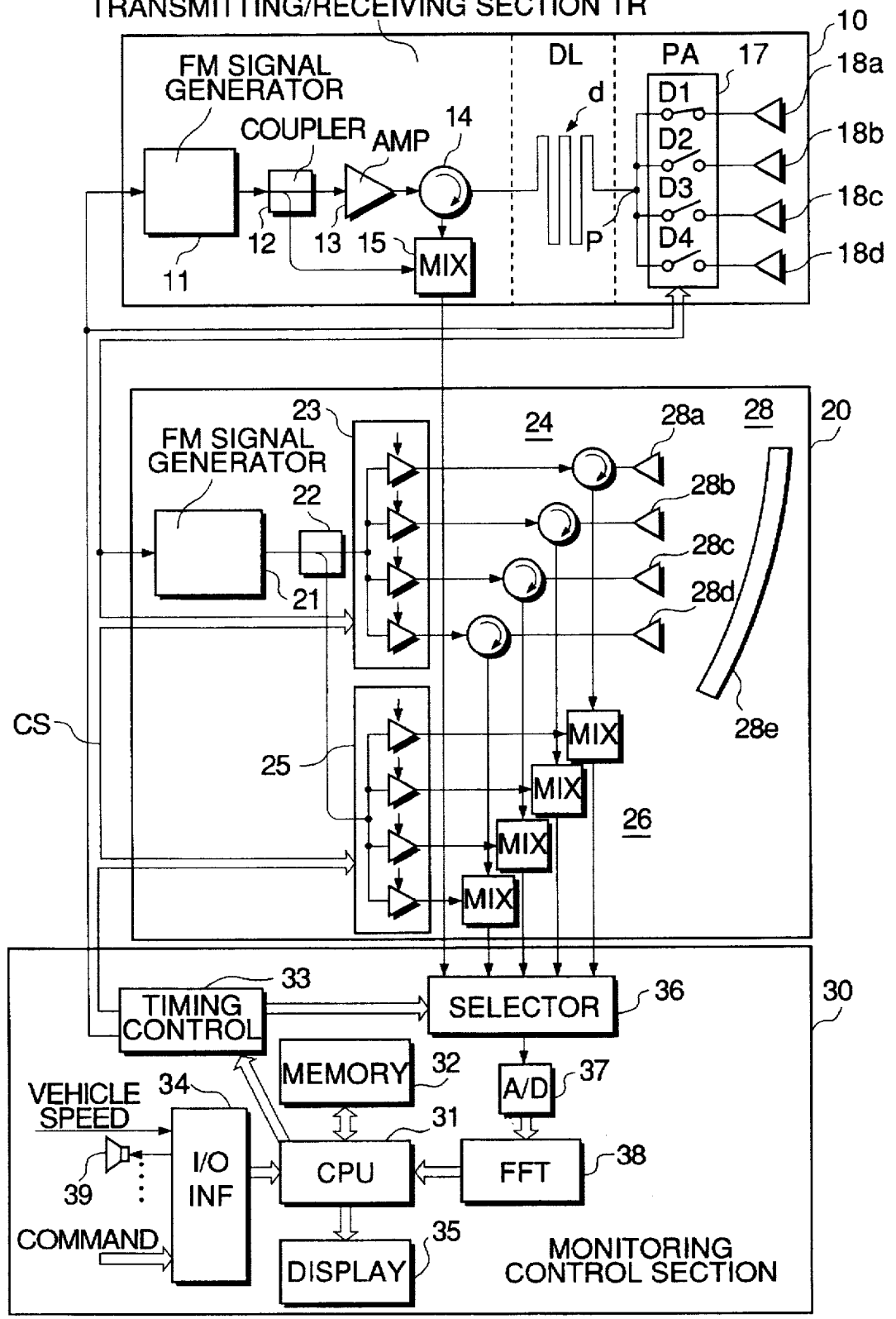
FIG. 1 is a block diagram showing the arrangement of a radar device for vehicle use according to one embodiment of the present invention.

FIG. 1 is a block diagram showing the construction of an FM radar device for vehicle use according to one embodiment of the present invention, wherein numeral 10 indicates an FM radar module for monitoring an adjacent object, numeral 20 indicates an FM radar module for monitoring a remote object and numeral 30 indicates a monitoring controller. Although only one FM radar module 10 for monitoring an adjacent object is shown in FIG. 1 for brevity, a plurality of FM radar modules 10 for plurality adjacent objects are usually mounted on both sides of the vehicle.

The FM radar module 10 for monitoring an adjacent object comprises a transmitting/receiving section TR, a plane antenna section PA and a delay circuit DL which is inserted between these sections. The transmitting/receiving section TR comprises an FM signal generator 11, a coupler 12, an amplifier 13, a circulator 14 and a mixer 15. The plane antenna section PA comprises four plane antennas 18a, 18b, 18c, 18d which have different direction sensing orientations from each other and a corresponding number of switching diodes D1, D2, D3, D4 which are inserted between a feeder distribution center P and the respective plane antennas.

The FM radar module 20 for monitoring a remote object comprises a transmitting/receiving section and a transmitting/receiving antenna section, wherein the transmitting/receiving section includes an FM signal generator 21, a coupler 22, a transmitting switching circuit 23, a group of circulators 24, a receiving switching circuit 25, a group of mixers 26, and a transmitting/receiving section 28 that includes four primary radiators 28a, 28b, 28c, 28d and a parabolic reflecting mirror 28e. The four primary radiators 28a, 28b, 28c, 28d are arranged around a focus of the parabolic reflecting 28e thus constituting an offset defocused multibeam antenna.

The monitoring controller section 30 comprises a CPU 31, a memory 32, a timing control circuit 33, an input interface circuit 34, a display circuit 35, a selector 36, an A/D converter circuit 37, and a fast Fourier transformation (FFT) circuit 38. The monitoring controller section 30 controls the respective operation timings of the FM radar modules 10 for monitoring an adjacent object and the FM radar modules 20 for monitoring a remote object, and detects the direction and the range to the obstacle by processing the frequencies and the levels of the beat signals output from the respective radar modules.

The FM signal generator 11 of the radar module 10 for monitoring an adjacent object generates FM signals which change the frequencies thereof linearly as time passes. The generated FM signals are divided at a desired ratio by the coupler, wherein one divided part of the FM signals is fed to the plane antenna section PA by way of the delay line d. The FM signal fed to the plane antenna section PA is radiated outside of the vehicle from one of the plane antennas 18a, 18b, 18c, 18d which have different sensing directions or directivity after passing through one of the PIN diodes D1, D2, D3, D4 which are selectively made to conduct under the control of the monitoring controller 30.

The reflected waves generated by an obstacle or the like outside the vehicle are received by some of the plane antennas 18a–18d and are fed to one input terminal of the mixer 15 by way of one of the PIN diodes which is conducting, the delay line d and the circulator 14. A part of the FM signals divided by the coupler 12 are fed to the other input terminal of the mixer 15. The FM signals included in the received reflected waves which are fed to one terminal of the mixer 15 are FM signals generated in the FM signal generator a certain time period ahead of FM signals fed to the other input terminal of the mixer 15.

The above certain time period is exactly the time which FM signals require for being radiated from one of the plane antennas after passing through the delay line d, propagated to the obstacle, reflected from the obstacle, received by one of the plane antennas and passing through the delay circuit DL. Namely, the certain time period is the propagation time which the radio waves require for reciprocating a distance between the front portion of the delay circuit d and the obstacle. In this case, however, the propagation time of FM signals for passing through the amplifier 13 and the circulator 14 is ignored since such time is short. Accordingly, the mixer 15 outputs beat signals having frequencies which are equal to the multiplied value or product of the above propagation time and the frequency varying speed of the FM signals. Namely, the frequencies of the beat signals include information on the propagation time of radio waves to the obstacle which generate the reflected waves, or information on the range. The beat signals including information on the range are fed to the selector 36 of the monitoring controller 30.

In the same manner, the FM signals generated in the FM signal generator 21 of the radar module 20 for monitoring a remote object are divided by the coupler 22 at a desired ratio and one divided part of the FM signals is fed to the transmitting switching circuit 23 and the other part or the remaining part of the FM signals is fed to the receiving switching circuit 25. Four amplifiers which constitute the transmitting switching circuit 23 are operated one by one in the order of arrangement by bias voltages selectively fed from the timing control circuit 33 in the monitoring control portion 30. The FM signals pass through the amplifier under operation, pass through one of the circulators 24, are radiated from one of the primary radiators 28a–28d, are reflected by the reflection mirror and are radiated in a frontal direction of the vehicle.

The reflected waves generated by an obstacle in front of the vehicle are propagated to the vehicle taking a path reverse to the wave radiating path, enter some of the primary radiators 28a–28d, and are fed to some of the mixers 26 by way of some of the circulators 24. FM signals generated by the FM signal generators 21 are fed to the mixers 26 by way of the transmitting switching circuit 25 which is operated in synchronism with the receiving switching circuit 23. Accordingly, beat signals are generated by one of the mixer circuits 26 upon receiving the received reflected signals from the corresponding circulator 24 and FM signals from the transmitting switching circuit 25, respectively, and such beat signals are fed to the selector 36 of the monitoring controller 30.

Following selection control signals received from the timing control circuit 33 which generates and outputs various timing signals under the control of the CPU 31, the selector 36 in the monitoring controller 30 selects one of the beat signals fed from the radar module 10 for monitoring an adjacent object and one of the beat signals fed from the radar module 20 for monitoring a remote object, respectively, and supplies the selected beat signals to the A/D converter circuit 37 in a next step. The digital beat signals output from the A/D converter circuit 37 are converted into a spectrum of the beat signals by the fast Fourier transformation circuit 38 and this spectrum are fed to CPU 31.

The CPU 31 prepares information concerning the obstacle by analyzing the frequencies and the levels in the spectrum of the beat signals, displays the information on the display device 35, and administrates or stores the information as the filed information concerning the obstacle in the memory 32. Furthermore, the CPU 31 analyzes conditional information on the vehicle such as traveling speed or rate of acceleration which is input from various sensors by way of the input/output interface circuit 34 and the filed information administrated by the memory 32. If any danger is envisaged, the CPU 31 outputs signals to speakers 39 or the like by way of the input/output interface circuit 34 so that the speaker generates an alarming sound or message. In case the radar device according to this embodiment is applied to the radar cruising system, the monitoring information including the above-mentioned information is fed to the CPU for controlling a throttling of the engine and for controlling brakes.

Figure 2:
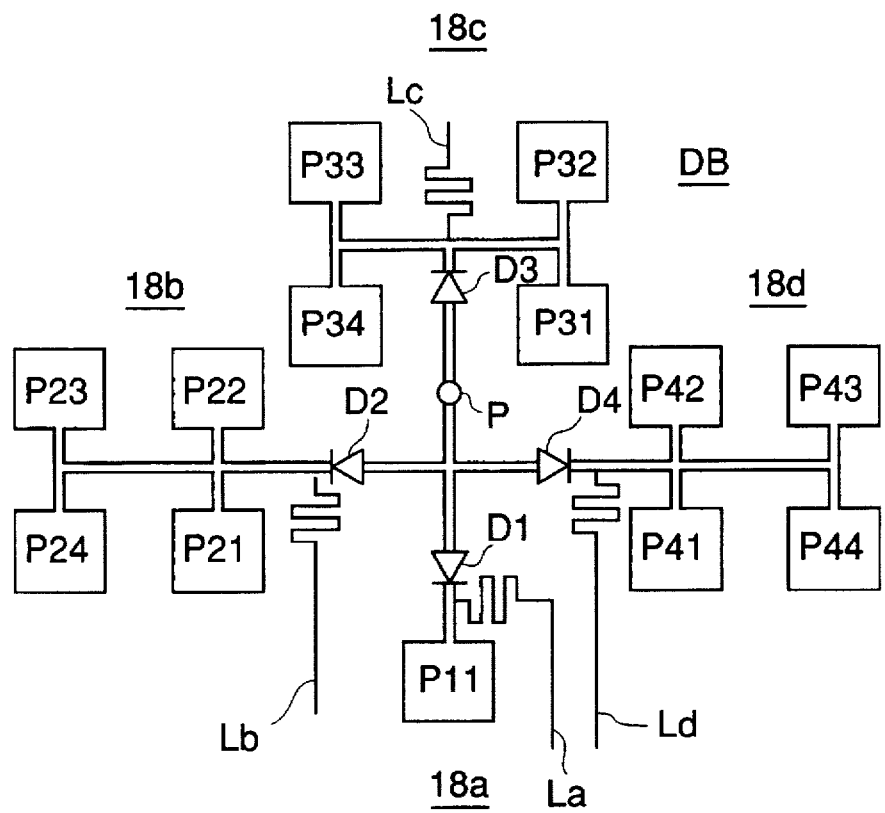
FIG. 2 is a schematic plan view showing the construction of arrayed plane antennas of an FM module for monitoring an adjacent object by this embodiment of the invention.

The plane antenna section PA of the FM radar module 10 for monitoring an adjacent object, as shown in FIG. 2, includes a plurality of rectangular patches P11, P21–P24, P31–P34 and P41–P44 (generally referred to as P11–P44) which are arranged on a dielectric board DB. The dielectric board DB is provided with a ground conductive plate GP (see FIG. 7) on the rear surface thereof while the feeder distribution center P is provided at the center of the front surface thereof. A plurality of microstrip type feeders which connect this feeder distribution center P with the patches respectively are mounted on the front surface of the dielectric board DB. The patches P11–P14 form four antennas 18a, 18b, 18c, 18d which radiate beams of different tilting angles predetermined by the difference in length of the respective feeder lines.

Figure 3:
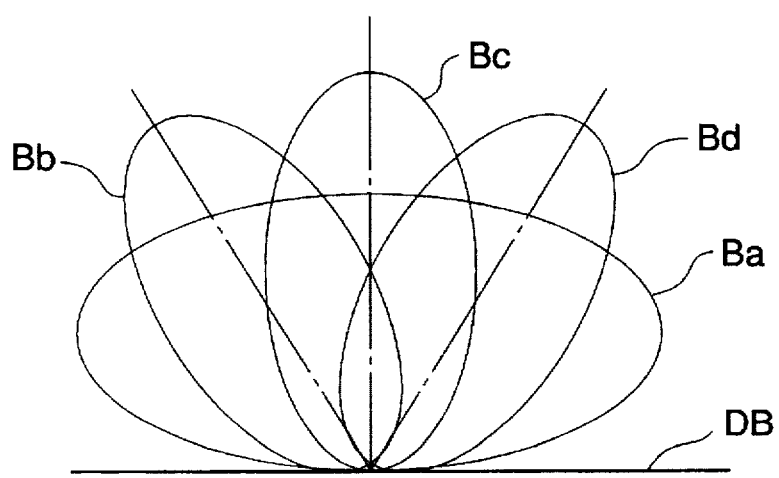
FIG. 3 is a schematic view showing the direction sensing characteristics of the arrayed plane antennas of FIG. 2.

The single patch 11 forms the plane antenna 18a which has a wide direction sensing characteristic (or directivity) assuming a direction normal to the dielectric board DB as the center, as depicted by a curve Ba in FIG. 3. Four patches P21, P22, P23, P24 form the plane antenna 18b which has a narrow directivity with a left-side tilting angle as the center, as depicted by a curve Bb of FIG. 3. Furthermore, four patches P31, P32, P33, P34 form the plane antenna 18c which has a narrow directivity with the normal direction as the center, as depicted by a curve Bc of FIG. 3. Still furthermore, four patches P41, P42, P43, P44 form the plane antenna 18d which has a narrow directivity with a right-side tilting angle as the center, as depicted by a curve Bd of FIG. 3.

In the midst of the feeder which connects the feeder distribution center P provided at the center of the dielectric board DB and the four plane antennas 18a–18d, the PIN diodes D1, D2, D3, D4 which have excellent high frequency characteristics are respectively inserted. A bias voltage is fed to the anode terminals of respective PIN diodes D1, D2, D3, D4 from the common feeder distribution center P, while the control of the bias voltage at the cathode terminals of respective PIN diodes D1, D2, D3, D4 is respectively carried out by way of low region circuits having a zigzag configuration and lead lines La, Lb, Lc, Ld which are both depicted in thin lines in FIG. 2. As shown in the block diagram of FIG. 1, the control of bias voltage to the cathode terminal of the respective PIN diodes D1, D2, D3, D4 is carried out by CPU 31 of the monitoring controller 30 by way of the timing control circuit 33 and the control signal lines CS. Namely, PIN diodes D1, D2, D3, D4 are selectively switched on and off under the control of monitoring control section 30 and one of plane antennas 18a, 18b, 18c, 18d which have different directivities is selected as an antenna for transmitting and receiving signals for detecting the adjacent object.

The CPU 31 of the monitoring controller 30 decides the operation mode of the radar module 10 for monitoring an adjacent object from a plurality of operation modes which are different from each other depending on levels (sensitivity) of the received reflected waves. Namely, CPU 31 shifts the operation mode of the radar module 10 for monitoring an adjacent object to a high resolution mode for a predetermined time, if any one of the levels of reflected waves which are respectively detected by the four plane antennas 18a–18d of the radar module 10 for monitoring an adjacent object exceeds the threshold level Lth. In this high resolution mode, three plane antennas 18b, 18c, 18d which have narrow directivities are sequentially and effectively operated thus enabling the scanning of high directivity resolution.

The CPU 31 shifts the operation mode of the radar module 10 for monitoring an adjacent object to a low resolution mode for a predetermined time, if the levels of reflected waves which are respectively detected by the four plane antennas 18a8a~18d of the radar module 10 for monitoring an adjacent object are all below the threshold Lth. In this low resolution mode, one plane antenna 18a which has a wide directivity is effectively operated.

Figure 4:
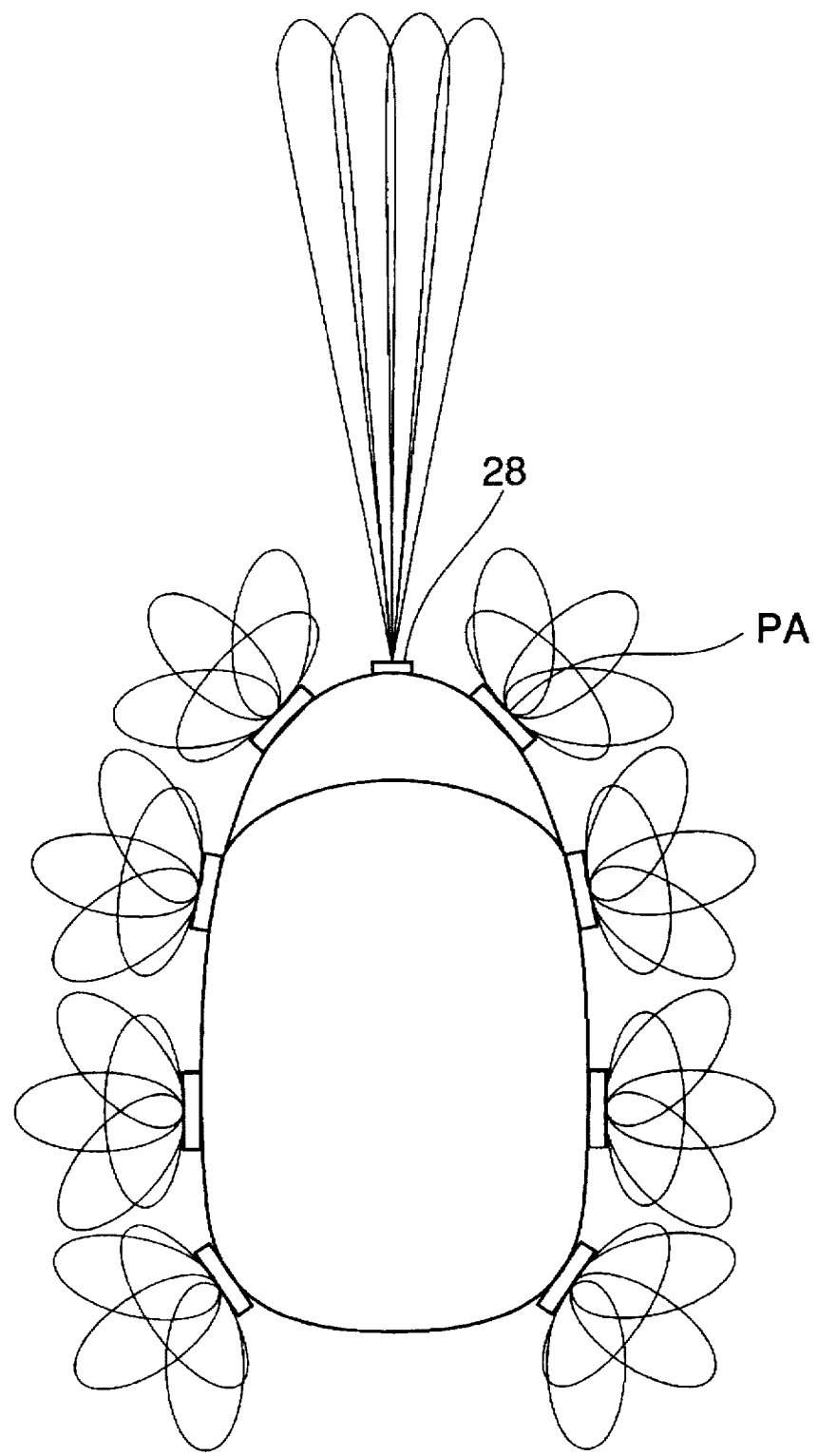
FIG. 4 is a schematic plan view illustrating the direction sensing characteristics of the FM radar module for monitoring a remote object and the FM radar modules for monitoring an adjacent object which are mounted on the vehicle.

The CPU 31 executes the control of the operation of the radar module 20 for monitoring a remote object in parallel with the control of the operation of the radar module 10 for monitoring an adjacent object. The antenna 28 of the radar module 20 for monitoring a remote object has a considerably sharper directivity compared to the plane array antennas of the radar module 10 for monitoring an adjacent object and therefore radiates sharp or keen beams which can detect an object located in a range of approximately 150 m ahead of a vehicle. As illustrated in FIG. 4, the antenna 28 for monitoring a remote object which has a sharp sensitivity is mounted on the front part of the vehicle, while the plane antennas of FM modules 10 for monitoring an adjacent object are mounted on both sides of the vehicle. As mentioned previously, although one FM radar module 10 for monitoring an adjacent object is shown in FIG. 1 for brevity, in actual use, a plurality of FM radar modules 10 for monitoring adjacent objects are mounted on both sides of the vehicle.

The CPU 31 operates the radar module 10 for monitoring an adjacent object and the radar module 20 for monitoring a remote object on a time sharing basis if the vehicle speed detected by a vehicle speed sensor exceeds a predetermined threshold level Vth, while CPU operates only the radar module 10 for monitoring an adjacent object if the vehicle speed is below the predetermined threshold level Vth. The above mentioned shifting by time sharing between modules as well as in respective modules corresponding to the vehicle speed and the previously mentioned shifting of modes in the modules corresponding to the detected sensitivity are explained in view of a flow chart shown in FIG. 5. In this flow chart, however, a plurality of radar modules 10 for monitoring an adjacent object are assumed to be present.

When the execution of the control processing is started, CPU 31 detects if the velocity speed exceeds the predetermined threshold level Vth (step 51). If the answer is yes, the radar module 20 for monitoring a remote object and the radar module 10 for monitoring an adjacent object are both operated on a time sharing basis so as to monitor the remote object and adjacent object (step 52). Then, CPU 31 selects the radar modules 10 for monitoring an adjacent object which have greater sensitivity (the level of the reflected waves exceeding a predetermined threshold level Lth) out from the plurality of radar modules 10 for monitoring an adjacent object and shifts the selected radar modules 10 to the high resolution mode while shifting the other or remaining radar modules 10 (the level of the reflected waves being below the predetermined threshold level Lth) to the low resolution mode (step 53).

The CPU 31 resets a timer incorporated therein and repeats the monitoring of a remote object and an adjacent object on a time sharing basis until the time set by the timer is over (steps 54, 55, 56). Assuming that four radar modules 10 for monitoring an adjacent object are used, one example of the operational sequence of the monitoring of the remote object and the adjacent object is illustrated in FIG. 6A. Namely, first, four transmitting/receiving antennas for monitoring a remote object of the radar module 20 for monitoring a remote object are sequentially scanned on a time sharing basis as a remote monitoring 1, a remote monitoring 2, a remote monitoring 3 and a remote monitoring 4 as shown in FIG. 6A. Subsequently, four radar modules 10 for monitoring an adjacent object are sequentially scanned in a low resolution mode as an adjacent monitoring 1, an adjacent monitoring 2, an adjacent monitoring 3 and an adjacent monitoring 4. Namely, this example shows that the four radar modules 10 for monitoring an adjacent object are all in a low resolution mode because the sensitivity of these radar modules 10 are all small or weak.

If only one of the four radar modules 10 for monitoring an adjacent object is in a high resolution mode, with respect to that radar module "1" for monitoring an adjacent object, the three antennas for monitoring an adjacent object are scanned as an adjacent monitoring 1-1, an adjacent monitoring 1-2 and an adjacent monitoring 1-3, as shown in FIG. 6B.

Figure 5:
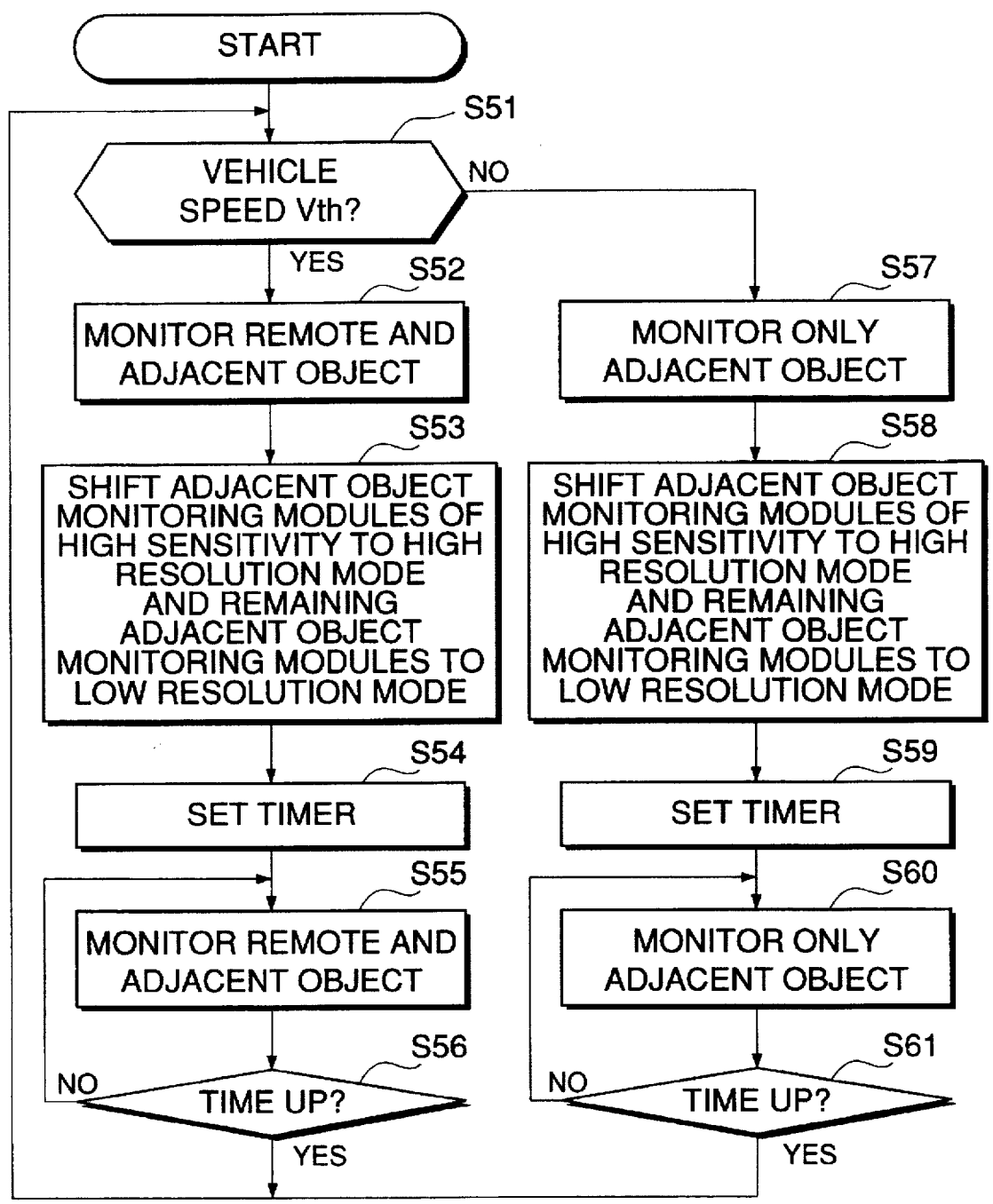
FIG. 5 is a flow chart explaining one example of a switching principle of antennas executed by the CPU of the monitoring control section shown in FIG. 1 between adjacent monitoring/remote monitoring FM radar modules as well as in respective FM radar modules.

Referring now to FIG. 5, in step 51, if CPU 31 judges that the vehicle speed does not exceed the threshold level Vth, CPU 31 executes only an adjacent monitoring by using FM radar modules 10 for monitoring an adjacent object (step 57). Subsequently, the CPU 31 selects radar modules 10 for monitoring an adjacent object which have greater sensitivity (the level of the reflected waves exceeding a predetermined threshold level Lth) out from the plurality of radar modules 10 for monitoring an adjacent object and shifts the selected radar modules 10 to the high resolution mode while shifting the other or remaining radar modules 10 (the level of the reflected waves being below the predetermined threshold level Lth) to the low resolution mode (step 58).

The CPU 31 resets the timer incorporated therein and repeats only the monitoring of an adjacent object on a time sharing basis until the time set by the timer is over (steps 59, 60, 61). As shown in FIG. 6C, among the four FM radar modules 10 for monitoring an adjacent object, three FM radar modules 10 are operated in a high resolution mode while the remaining one FM radar module 10, i.e. module "4", is operated in a low resolution mode.

FIG. 7 is a cross sectional view showing the construction of the FM radar module 10 for monitoring an adjacent object. The FM radar module 10 for monitoring an adjacent object is constructed such that the plane antenna portion PA for transmitting and receiving signals forms an upper layer. The plane antenna portion PA is stacked on the transmitting/receiving portion TR for transmitting FM signals to be supplied to the plane antenna portion PA and receiving signals which the plane antenna portion PA receives and this transmitting/receiving portion TR forms a lower layer. The signal delay circuit DL having the delay line d is inserted between the plane antenna portion PA and the transmitting/receiving portion TR as an intermediate layer. An input signal to or output signal from the transmitting/receiving portion TR is input or output through a terminal T1. An input signal for scanning a beam is input to a terminal T2, by which the planar array antenna PA is controlled. The planar array antenna PA is covered and protected with a radome R from the external environment.

Figure 8A:
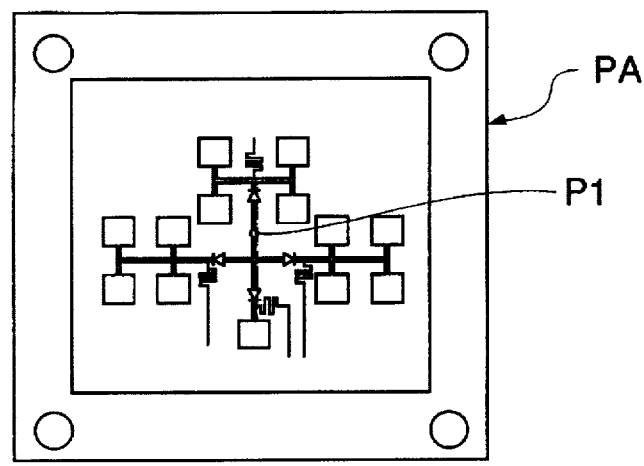
Figure 8B:
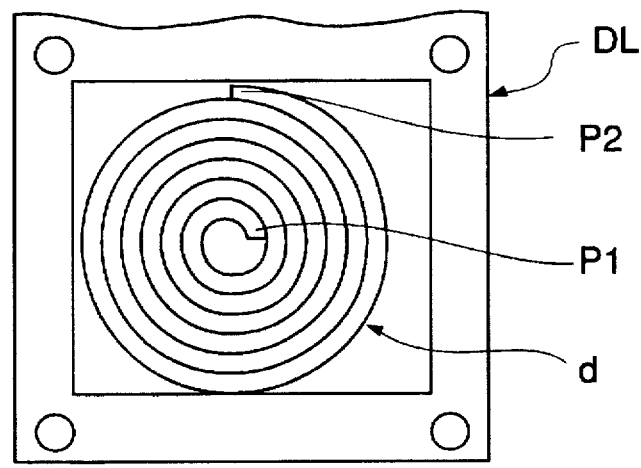
Figure 8C:
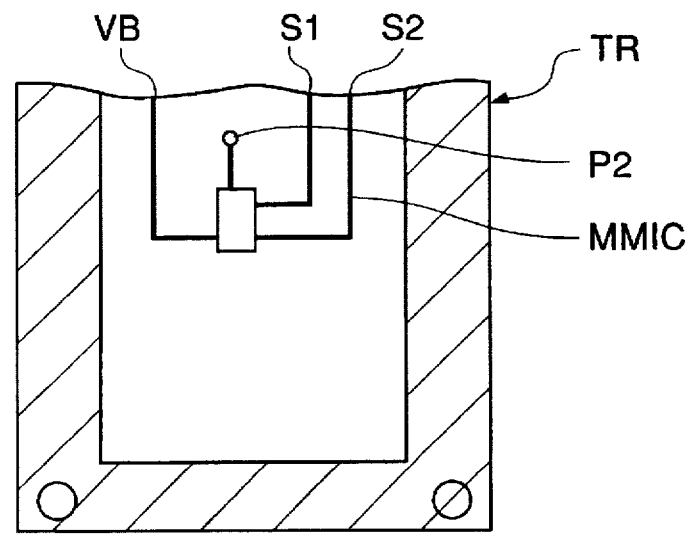

The plane antenna portion PA which forms the upper layer, the delay portion DL which forms the intermediate layer and the transmitting/receiving portion TR which forms the lower layer have constructions which are shown in FIGS. 8A, 8B and 8C as plan views, respectively. The plane antenna portion PA which forms the upper layer and one end of the delay circuit d which forms the signal delay portion DL as the intermediate layer are connected with each other at a high frequency level by way of beads P1, while the other end of the delay circuit d is connected with the transmitting/receiving portion TR at a high frequency level by way of beads P2.

Figure 9:
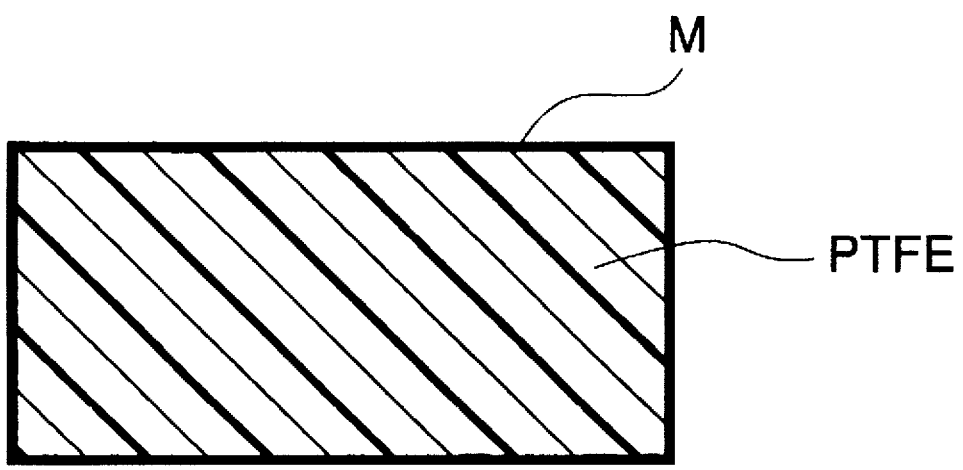
FIG. 9 is a cross sectional view showing one example of the construction of the resin-made waveguide which constitutes the delay portion DL shown as an intermediate layer at line 2B of FIG. 7 and in FIG. 8B.

The delay line d which constitutes the signal delay circuit DL as the intermediate layer is composed of a vortex shaped resin-made waveguide. This waveguide has been newly developed on a trial basis by the inventors of this invention for using the waveguide in the FM radar modules according to this embodiment. The waveguide has a cross sectional shape shown in FIG. 9. This resin-made waveguide is constructed such that metal foil M is plated on the surface of a bar member having a rectangular cross section and made of polytetrafluoride ethylene (PTFE). The cross sectional shape of the dielectric line has a longitudinal length/lateral width ratio of approximately 1:2 and in case the frequency of the FM signal to be delayed is 60 GHz, the lateral width is 3.8 mm which is smaller than the lateral width (5.8 mm) of the waveguide. This resin-made waveguide is smaller than the conventional waveguide and is resilient so that the waveguide has an advantage that a delay circuit having a considerably compact construction can be realized by densely winding the waveguide.

The passing loss in the resin-made waveguide is approximately 3 dB/m in a straight line when the frequency of the signals is 60 GHz. When the waveguide is bent with a small radius of curvature, however, the passing loss increases up to approximately 4 dB/m. Although this passing loss is greater than the value (approximately 1.2 dB/m) of a waveguide which has no dielectric loss, the passing loss is considerably smaller than the value (approximately 7 dB/m) of the microstrip line. This dielectric line is characterized by the favorable flexibility thereof so that the line can be extended forming an intensely wound vortex.

Since the passing loss increases as the radius of curvature of the resin-made waveguide becomes smaller, instead of a vortex shape which decreases the radius of curvature as the vortex advances toward the center thereof, a spiral or helcoid shape which has the same radius of curvature in its entirety can be adopted so as to decrease the passing loss.

The transmitting/receiving section TR, as shown in the block diagram of FIG. 1, is comprised of the FM signal generating circuit 11, the coupler 12, the amplifier 13, the circulator 14 and the mixer 15. The transmitting/receiving section TR, as shown in FIG. 7 and FIG. 8C, is formed into a monolithic integrated circuit (MMIC) and is housed in a package. FM signals are input into or output from this package by way of the beads P2, and timing signals and bias signals are fed to the package from the timing control circuit 33 by way of signal feeder lines S1, S2 and direct current operating electric power is fed to the package by way of a power source line VB. Since it is rather difficult to include the circulator 14 as an integral part of the monolithic integrated circuit (MMIC), it is considered that the circulator 14 is excluded from the monolithic integrated circuit (MMIC) and this excluded circulator 14 is attached to the outside of the other parts which constitute the monolithic integrated circuit (MMIC) thus providing a hybrid micro integrated structure.

The delay line (circuit) d which is generally realized by microstrip is provided for improving the function for detecting a very close or adjacent object by making the object appear to be located ahead of the vehicle and thus increasing the frequency of the beat signals. Accordingly, such a delay line necessitates using a line which is some dozen meters. Although the length of the delay circuit can be made shorter by the adoption of the zigzag structure such as Miander line or the voltex structure, there is a limitation on such a structure. According to this embodiment, instead of mounting the delay line or circuit on the same plane on which the plane antenna section and transmitting/receiving section are mounted, the delay line is stacked on these sections so that drastic down-sizing of the radar module is realized which greatly enhances the advantage when used as a radar module for vehicle use. Such an advantage is further enhanced if the resin-made waveguide of low passing loss which has been developed by the inventors of this invention is adopted as the delay line.

Furthermore, since the radar module 10 for monitoring an adjacent object shown in FIG. 1 is constructed such that a plurality of antennas 18a–18d are selectively connected with the transmitting/receiving section under the control of the selection connecting portion of the monitoring controller section 30, the radar module 10 requires only a single line of transmitting/receiving section which includes the amplifier, the circulator and the mixer so that manufacturing parts and space necessary for manufacturing and installing the radar device can be drastically decreased. It is also possible to decrease the manufacturing parts, installing space and manufacturing cost of the radar device by incorporating the transmitting/receiving section of the radar module 20 for monitoring a remote object into the NNIC circuit shown in FIG. 7.

Figure 10:
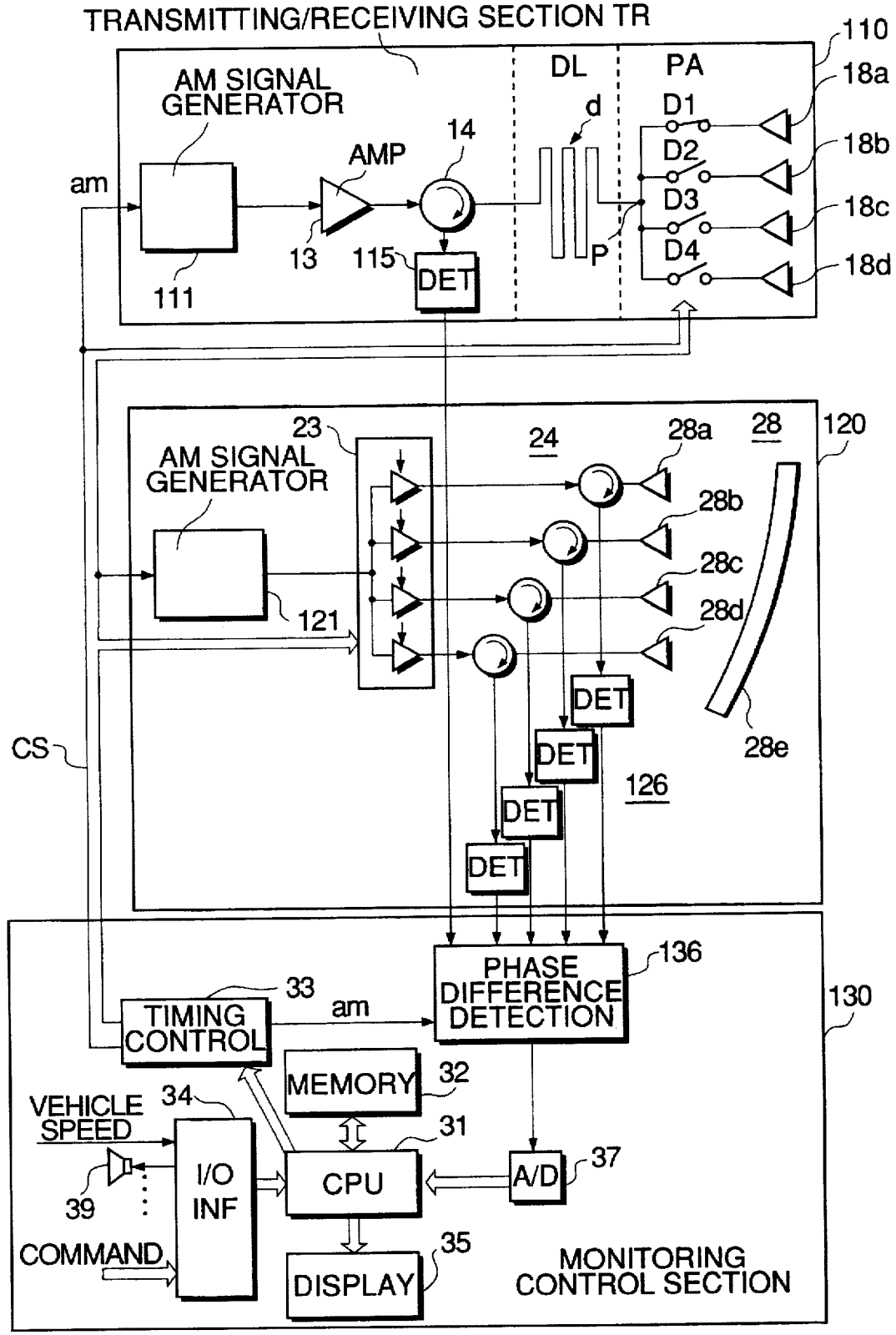
FIG. 10 is a block diagram showing the construction of the AM radar device for vehicle use according to another embodiment of the present invention.

FIG. 10 is a block diagram showing the construction of an AM radar device for vehicle use according to another embodiment of the present invention. In this AM radar device for vehicle use, the FM radar module 10 for monitoring an adjacent object and the FM radar module 20 for monitoring a remote object are respectively replaced with an AM radar module 110 for monitoring an adjacent object and an AM radar module 120 for monitoring a remote object.

In the AM radar module 110 for monitoring an adjacent object, the FM signal generator 11 and the mixer 15 of the FM radar module 10 for monitoring an adjacent object shown in FIG. 1 are replaced with an AM signal generator 111 and a detector 115, respectively, and the coupler 12 is removed. Similarly, in the AM radar module 120 for monitoring a remote object, the FM signal generator 21 and the group of mixers 26 of FM radar module 20 for monitoring a remote object shown in FIG. 1 are replaced with an AM signal generator 121 and a group of detectors 126, respectively, and the switching circuit 25 and the coupler 12 are removed.

With these alterations of the radar modules for monitoring an adjacent object and a remote object respectively from the FM system to the AM system, in the monitoring control section 130, the selector 36 and the fast Fourier transformation circuit 38 in the monitoring control section 30 shown in FIG. 1 are removed while a phase difference detecting circuit 136 is added. Modulating signals "am" for amplitude modulation are fed to the AM radar modules 110, 120 for monitoring an adjacent object and remote object, respectively, through the phase difference detecting circuit 136.

The AM system radar device for vehicle use shown in FIG. 10 executes exactly the same operations as the FM system radar device for vehicle use which have been explained in detail heretofore in conjunction with FIG. 1 although the system is different. Since the general principles of operation of an AM radar device are well known to those who are skilled in the art, no further explanation of the AM system radar device for vehicle use according to this invention is made in this specification.

FIG. 11 is a block diagram showing the construction of a pulse radar device for vehicle use according to another embodiment of the present invention. In this pulse radar device for vehicle use, the FM radar module 10 for monitoring an adjacent object and the FM radar module 20 for monitoring a remote object of FIG. 1 are respectively replaced with a pulse radar module 210 for monitoring an adjacent object and a pulse radar module 220 for monitoring a remote object.

In the pulse radar module 210 for monitoring an adjacent object, the FM signal generator 11 of the FM radar module 10 for monitoring an adjacent object shown in FIG. 1 is replaced with a pulse signal generator 211, and the coupler 12 and the mixer 15 are removed. Similarly, in the pulse radar module 220 for monitoring a remote object, the FM signal generator 21 of the FM radar module 20 for monitoring a remote object shown in FIG. 1 is replaced with a pulse signal generator 221, and the coupler 12, the receiving switching circuit 25 and the group of mixers 26 are removed.

With these alterations of the radar modules for monitoring an adjacent object and a remote object respectively from the FM system to the pulse system, in the monitoring control section 230, the selector 36 and the fast Fourier transformation circuit 38 in the monitoring control section 30 shown in FIG. 1 are removed. The pulse system radar device for vehicle use shown in FIG. 11 executes exactly the same operations as the FM system radar device for vehicle use which have been explained in detail heretofore in conjunction with FIG. 1 although the system is different. Since the general principles of operation of a pulse radar device are well known to those who are skilled in the art, no further explanation of the operation of the pulse system radar device for vehicle use according to this invention is made in this specification.

Heretofore, a radar device which stops the operation of the radar module for monitoring a remote object when the vehicle speed is below the threshold level Vth has been illustrated and described. In general, however, the radar device may be constructed such that an intermediate operating condition is adopted between the condition where the radar module is operated and the condition where the radar module is not operated and in such an intermediate operating condition, the ratio of operating time between the radar module for monitoring a remote object and the radar module for monitoring an adjacent object is changed in a step manner or smoothly.

Furthermore, the radar device may be constructed such that in high speed linear traveling, only the radar module 20 for monitoring a remote object is operated and the radar modules 10 for monitoring an adjacent object are used in parallel with the radar module 20 for monitoring a remote object only at the time of changing lanes of the road.

Furthermore, heretofore, a radar module for monitoring an adjacent object which can set a tilting angle thereof in left and right directions has been illustrated and described. The radar module, however, may set a tilting angle thereof in front and rear directions or in a combined direction of left and right directions and front and rear directions.

Furthermore, heretofore, each plane antenna of the radar module for monitoring an adjacent object which is formed by four patches at the maximum has been illustrated and described. Each plane antenna, however, may be formed by more patches if necessary, for example, for making the directivity thereof more sensitive.

Furthermore, heretofore, with respect to the radar module for monitoring an adjacent object, the application of beams to scanning has been explained such that the radio waves are radiated from only one of a plurality of plane antennas. It is possible, however, to make more than two plane antennas radiate radio beams simultaneously and change the combined directivities of the beams.

Furthermore, heretofore, with respect to the radar module for monitoring an adjacent object, the delay circuit for the FM signals, the AM signals and the pulse signals is realized by the resin-made waveguide which has a small passing loss. It is possible, however, to use a delay circuit made of microstrip or triplate in lieu of the dielectric line provided that the increase in the passing loss is allowable.

Furthermore, heretofore, the radar module for monitoring an adjacent object and the radar module for monitoring a remote object both use transmitting/receiving antennas which can transmit signals and receive reflected signals. It is possible, however, to use some antennas for exclusively transmitting and other antennas for exclusively receiving, if necessary.

As has been described heretofore, the radar device for vehicle use according to the present invention is constructed such that the radar module is separated into a radar module for monitoring an adjacent object and a radar module for monitoring a remote object and a common monitoring controller section is provided for controlling the operations of both radar modules so that the monitoring function is enhanced compared to a conventional radar device which accomplishes the remote monitoring and the adjacent monitoring by a common radar module. Furthermore, as compared to a case in which the radar devices for monitoring a remote object and an adjacent object, respectively, are separately manufactured and installed on a vehicle, the radar device according to the present invention can be manufactured easily and cheaply since the common monitoring control section is used.

According to the preferred embodiment of the present invention, the ratio of operation time of the adjacent object monitoring relative to the operation time of the remote object monitoring is altered according to the vehicle speed. By taking into account the condition that the remote object monitoring is important during high speed driving, while it is unnecessary during the low speed driving on a jammed road or on a narrow street or at the time of the vehicle entering a garage, the radar device shares a sufficient operation time to each module which carries out a more important function at that time so that the total functions of the radar device are enhanced.

Furthermore, in this invention, a radar system which transmits high frequency signals to an object, receives a reflected signal from the object and detects a range to the object based on the transmitted signal and the received signal is provided and such a radar system comprises a first antenna having a wide directivity, a second antenna having a narrow directivity and means for switching the first antenna and the second antenna on a time sharing basis.

Preferably, the second antenna which has a narrow directivity comprises a plurality of antennas having different beam tilting angles respectively.

Preferably, these antennas which have different beam tilting angles are selectively switched on a time sharing basis.

Preferably, the first and second antennas are both plane antennas which are mounted on the same dielectric board.

Preferably, the first and second antennas are switched from the first antenna to the second antenna when the reflected signal from the object exceeds a threshold level.

While the invention has been described in detail and with reference to specific embodiments thereof, it will be apparent to those skilled in the art that various changes and modifications may be made therein without departing from the spirit and scope of the invention.

What is claimed is:

1. A radar device for vehicle use comprising;
    an FM radar module for monitoring an adjacent object including a plurality of adjacent object monitoring antennas, a signal transmitting/receiving section for supplying transmitting FM signals to said adjacent object monitoring antennas and outputting beat signals by mixing said transmitting FM signals with received FM signals supplied from said adjacent monitoring antennas, and a delay circuit inserted between said signal transmitting/receiving section and said adjacent object monitoring antennas,
    an FM radar module for monitoring a remote object including a remote object monitoring antenna and a signal transmitting/receiving section for feeding transmitting FM signals to said remote object monitoring antenna and generating beat signals by mixing said transmitting FM signals with received FM signals supplied from said remote monitoring antenna, and
    a monitoring controller controlling operations of said FM radar module for monitoring an adjacent object and said FM radar module for monitoring a remote object, said monitoring controller receiving said beat signals output from said FM radar modules and detecting a range to an object which generates reflected signals based on frequencies of said beat signals.

2. A radar device for vehicle use according to claim 1, wherein said monitoring controller alters a ratio of an operation time of said FM radar module for monitoring said remote object relative to an operation time of said FM radar module for monitoring said adjacent object according to a velocity of a vehicle on which said radar device is mounted.

3. A radar device for vehicle use according to claim 2, wherein said monitoring controller sets said ratio of operation time of said FM radar module for monitoring a remote object relative to said operation time of said FM radar module for monitoring an adjacent object at zero when the vehicle velocity is below a predetermined value.

4. A radar device for vehicle use according to one of any preceding claims 1 to 3, wherein said adjacent object monitoring antennas of said FM radar module for monitoring an adjacent object include a plurality of plane antennas capable of transmitting and receiving signals, said plane antennas having different beam tilting angles, having relatively narrow directivities, and being selectively connected with said signal transmitting/receiving section under control of said monitoring controller.

5. A radar device for vehicle use according to claim 4, wherein said adjacent object monitoring antennas of said FM radar module for monitoring an adjacent object further include wide angle plane antennas which have a relatively wide directivity and are selectively connected with said signal transmitting/receiving section under control of said monitoring controller.

6. A radar device for vehicle use according to claim 5, wherein during a period in which said monitoring controller receives said FM signals above a predetermined value through at least any one of said adjacent object monitoring antennas, said monitoring controller shifts to a high resolution mode where said monitoring controller sequentially operates a plurality of said plane antennas which have a relatively narrow directivity, while during periods other than said period said monitoring controller shifts to a low resolution mode where said monitoring controller operates only said plane antennas having a relatively wide directivity.

7. A radar device for vehicle use according to any one of preceding claims 1 to 3, wherein said remote object monitoring antenna of said FM radar module for monitoring a remote object is a defocused offset antenna which includes a reflection mirror and a plurality of primary radiators which are arranged in a focus of said reflection mirror and are sequentially connected with said signal transmitting/receiving section.

8. A radar device for vehicle use according to claim 7, wherein said adjacent object monitoring antennas of said FM radar module for monitoring an adjacent object include a plurality of plane antennas capable of transmitting and receiving signals, said plane antennas having different beam tilting angles, having relatively narrow directivities, and being selectively connected with said signal transmitting/receiving section under control of said monitoring control means.

9. A radar device for vehicle use according to claim 8, wherein said adjacent object monitoring antennas of said FM radar module for monitoring an adjacent object further include wide angle plane antennas which have a relatively wide directivity and are selectively connected with said signal transmitting/receiving section under control of said monitoring control means.

10. A radar device for vehicle use according to claim 9, wherein during a period in which said monitoring controller receives said FM signals above a predetermined value through at least any one of said adjacent object monitoring antennas, said monitoring controller shifts to a high resolution mode where said monitoring controller sequentially operates a plurality of said plane antennas which have a relatively narrow directivity, while during periods other than said period, said monitoring controller shifts to a low resolution mode where said monitoring controller operates only said plane antennas having a relatively wide directivity.

11. A radar device for vehicle use comprising;
    an AM radar module for monitoring an adjacent object including a plurality of adjacent object monitoring antennas, a signal transmitting/receiving section for supplying transmitting AM signals to said adjacent object monitoring antennas and outputting detected signals obtained by detecting received AM signals supplied from said antennas, and a delay circuit inserted between said signal transmitting/receiving section and said adjacent object monitoring antennas,
    an AM radar module for monitoring a remote object including a remote object monitoring antenna and a signal transmitting/receiving section for supplying transmitting AM signals to said remote object monitoring antenna and outputting detected signals obtained by detecting received AM signals supplied from said remote monitoring antenna, and
    a monitoring controller controlling operations of said AM radar module for monitoring an adjacent object and said AM radar module for monitoring a remote object, said monitoring controller receiving modulated signals output from said radar modules and detecting a range to an object based on a phase difference between said received detected signals and modulated signals employed for generating said AM signals.

12. A radar device for vehicle use according to claim 11, wherein said monitoring controller alters a ratio of an operation time of said AM radar module for monitoring a remote object relative to an operation time of said AM radar module for monitoring an adjacent object according to a velocity of a vehicle on which said radar device is mounted.

13. A radar device for vehicle use comprising;
    a pulse radar module for monitoring an adjacent object including a plurality of adjacent object monitoring antennas, a signal transmitting/receiving section for supplying transmitting pulse signals to said adjacent object monitoring antennas and outputting received pulse signals supplied from said adjacent monitoring antennas, and a delay circuit inserted between said signal transmitting/receiving section and said adjacent object monitoring antennas, a pulse radar module for monitoring a remote object including a remote object monitoring antenna and a signal transmitting/receiving section for supplying transmitting pulse signals to said remote object monitoring antenna and outputting received pulse signals from said remote monitoring antenna, and a monitoring controller controlling operations of said pulse radar module for monitoring an adjacent object and said pulse radar module for monitoring a remote object, said monitoring controller being capable of detecting a range to an object based on a generating timing of received pulse signals output from said pulse radar modules.

14. A radar device for vehicle use according to claim 13, wherein said monitoring controller alters a ratio of an operation time of said pulse radar module for monitoring said remote object relative to an operation time of said pulse radar module for monitoring said adjacent object according to a velocity of a vehicle on which said radar device is mounted.

15. A radar system which transmits a high frequency signal to an object and receives a reflected signal from said object for detecting a range to said object based on said transmitted signal and said received signal comprising a first antenna having a wide directivity, a second antenna having a narrow directivity and means for switching operations of said first antenna and said second antenna on a time sharing basis.

16. A radar system according to claim 15, wherein said second antenna having a narrow directivity comprises a plurality of antennas having different beam tilting angles respectively.

17. A radar system according to claim 16, wherein said plurality of antennas having different beam tilting angles respectively are selectively switched on a time sharing basis.

18. A radar system according to claim 15, wherein said first and second antennas are both plane antennas which are mounted on a single dielectric board.

19. A radar system according to claim 15, wherein operation of the system is switched from said first antenna to said second antenna when said reflected signal from said object exceeds a threshold level Lth.

20. A radar device for vehicle use comprising;

a first radar module for monitoring an adjacent object including a plurality of adjacent object monitoring antennas, a signal transmitting/receiving section for supplying transmitting signals to said adjacent object monitoring antennas and outputting received signals supplied from said adjacent monitoring antennas, and a delay circuit between said signal transmitting/receiving section and said adjacent object monitoring antennas, a second radar module for monitoring a remote object including a remote object monitoring antenna and a signal transmitting/receiving section for feeding transmitting signals to said remote object monitoring antenna and outputting received signals fed from said remote monitoring antenna, and a monitoring controller for controlling operation of said first and second radar modules, said monitoring controller receiving said signals output from said first and second modules and detecting a range to an object which generates reflected signals.

21. A radar device for vehicle use according to claim 20, wherein said monitoring controller alters a ratio of an operation time of said first radar module relative to an operation time of said second radar module corresponding to a velocity of a vehicle on which said radar device is mounted.

22. A radar device for vehicle use according to claim 21, wherein said monitoring controller sets said ratio of operation time of said second radar module relative to said operation time of said first radar module at zero when the vehicle velocity is below a predetermined value.

23. A radar device for vehicle use according to any one of claims 20, 21 or 22, wherein said adjacent object monitoring antennas of said first radar module include a plurality of plane antennas capable of transmitting and receiving signals, said plane antennas having different beam tilting angles, having relatively narrow directivities, and being selectively connected with said signal transmitting/receiving section under control of said monitoring control means.

24. A radar device for vehicle use comprising:

an FM radar module for monitoring an adjacent object including a plurality of adjacent object monitoring antennas, and a signal transmitting/receiving section for supplying transmitting FM signals to said adjacent object monitoring antennas and outputting beat signals by mixing said transmitting FM signals with received FM signals supplied from said adjacent monitoring antennas, an FM radar module for monitoring a remote object monitoring antenna and a signal transmitting/receiving section for feeding transmitting FM signals to said remote object monitoring antenna and generating beat signals by mixing said transmitting FM signals with received FM signals supplied from said remote monitoring antenna, and a monitoring controller controlling operations of said FM radar module for monitoring an adjacent object and said FM radar module for monitoring a remote object, said monitoring controller receiving said beat signals output from said FM radar modules and detecting a range to an object which generates reflected signals based on frequencies of said beat signals.

25. A radar device for vehicle use comprising:

an AM radar module for monitoring an adjacent object including a plurality of adjacent object monitoring antennas, and a signal transmitting/receiving section for supplying transmitting AM signals to said adjacent object monitoring antennas and outputting detected signals obtained by detecting received AM signals supplied from said antennas, an AM radar module for monitoring a remote object including a remote object monitoring antenna and a signal transmitting/receiving section for supplying transmitting AM signals to said remote object monitoring antenna and outputting detected signals obtained by detecting received AM signals supplied from said remote monitoring antenna, and a monitoring controller controlling operations of said AM radar module for monitoring an adjacent object and said AM radar module for monitoring a remote object, said monitoring controller receiving modulated signals output from said radar modules and detecting a range to an object based on a phase difference between said received detected signals and modulated signals employed for generating said AM signals.

26. A radar device for vehicle use comprising:

a pulse radar module for monitoring an adjacent object including a plurality of adjacent object monitoring antennas, and a signal transmitting/receiving section for supplying transmitting pulse signals to said adjacent object monitoring antennas and outputting received pulse signals supplied from said adjacent monitoring antennas, a pulse radar module for monitoring a remote object including a remote object monitoring antenna and a signal transmitting/receiving section for supplying transmitting pulse signals to said remote object monitoring antenna and outputting received pulse signals from said remote monitoring antenna, and a monitoring controller controlling operations of said pulse radar module for monitoring an adjacent object and said pulse radar module for monitoring a remote object, said monitoring controller being capable of detecting a range to an object based on a generating timing of received pulse signals output from said pulse radar modules.

27. A radar device for vehicle use comprising:

a first radar module for monitoring an adjacent object including a plurality of adjacent object monitoring antennas, and a signal transmitting/receiving section for supplying transmitting signals to said adjacent object monitoring antennas and outputting received signals supplied from said adjacent monitoring antennas, a second radar module for monitoring a remote object including a remote object monitoring antenna and a signal transmitting/receiving section for feeding transmitting signals to said remote object monitoring antenna and outputting received signals fed from said remote monitoring antenna, and a monitoring controller for controlling operation of said first and second radar modules, said monitoring controller receiving said signals output from said first and second modules and detecting a range to an object which generates reflected signals.

* * * * *